Patented July 29, 1952

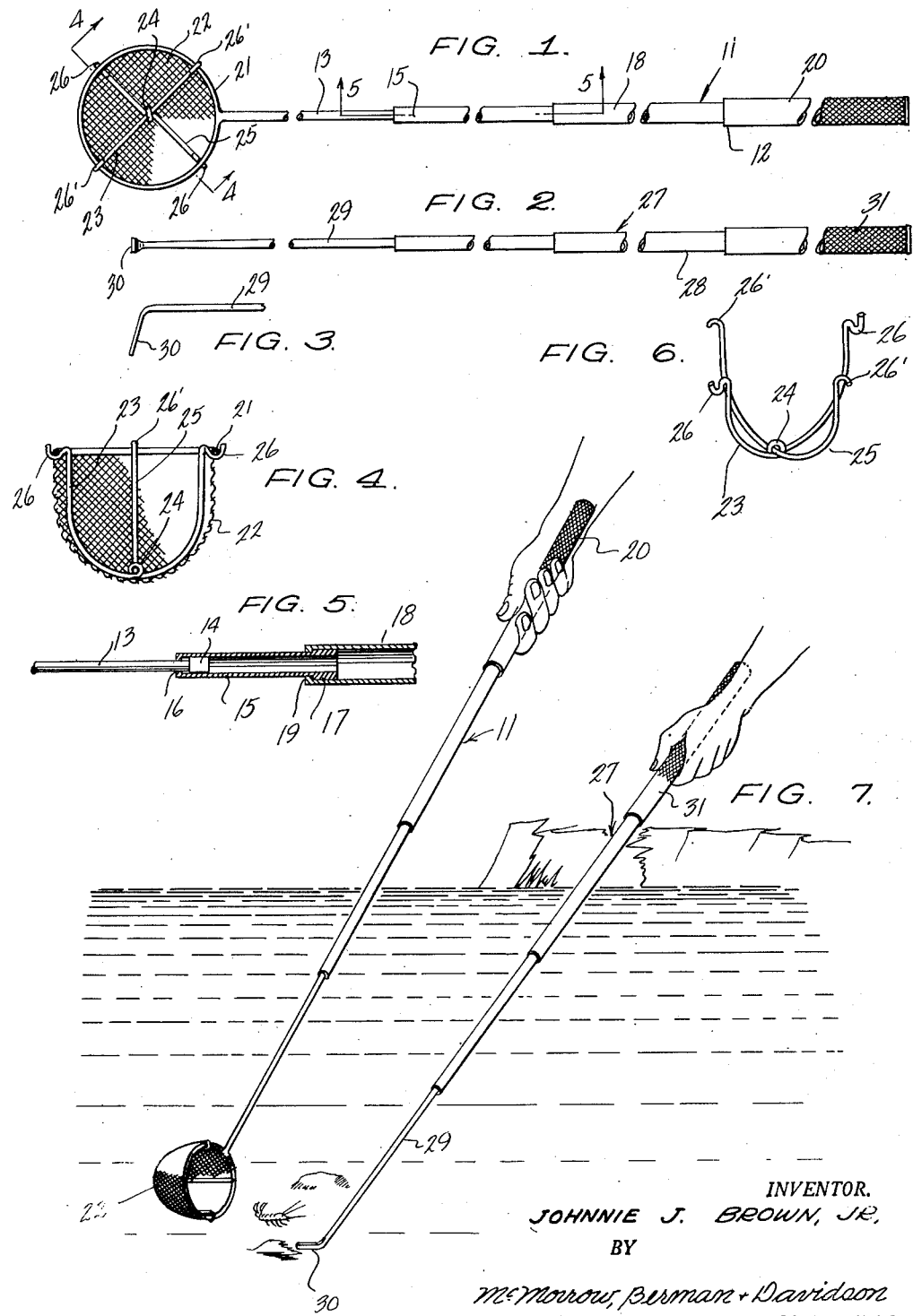
July 29, 1952 — J. J. BROWN, JR — 2,604,715
FISH BAIT CATCHING APPARATUS
Filed June 23, 1950
INVENTOR.
JOHNNIE J. BROWN, JR,
BY McMorrow, Berman + Davidson
ATTORNEYS.

2,604,715

UNITED STATES PATENT OFFICE 2,604,715

FISH BAIT CATCHING APPARATUS

Johnnie J. Brown, Jr., Pratt, W. Va.

Application June 23, 1950, Serial No. 169,963

1 Claim. (Cl. 43—11)

This invention relates to fishing equipment, and more particularly to snare devices for catching crayfish and similar bait.

A main object of the invention is to provide a novel and improved bait-catching apparatus which is simple in construction, which is easy to use, and which may be folded to a small size for transportation and storage.

A further object of the invention is to provide an improved bait-catching apparatus which is very inexpensive to manufacture, which is sturdy in construction, which is convenient to manipulate, and which involves relatively few parts.

Further objects and advantages of the invention will become apparent from the following description and claims, and from the accompanying drawings, wherein:

Figure 1 is a plan view of a hand net device forming a part of the improved apparatus of the present invention;

Figure 2 is a plan view of the prod member forming a part of the present invention;

Figure 3 is a fragmentary, side elevational view of the end portion of the prod member of Figure 2;

Figure 4 is an enlarged, cross-sectional, detail view taken on line 4—4 of Figure 1;

Figure 5 is an enlarged, fragmentary, cross-sectional, detail view taken on line 5—5 of Figure 1;

Figure 6 is a perspective, detail view of the resilient spreader frame employed in the basket portion of the hand net of Figure 1;

Figure 7 is a perspective view illustrating the manner of using the prod member of Figure 2 in combination with the hand net of Figure 1 in catching bait.

Referring to the drawings, and more particularly to Figures 1, 4 and 6, the hand net member is designated generally at 11, and comprises an extensible, telescopic handle 12 comprising a plurality of telescopic sections which are slidable to the extended position of Figure 1, and which may be collapsed to a relatively short length when the device is not in use. As shown in Figure 5, the handle 12 has a rod member 13 as its end section, said rod member being provided with an enlarged head 14 which is cylindrical in cross-section and which is slidably received in a sleeve member 15 provided at one end with an inturned flange 16 restraining the rod member 15 from extension beyond the position shown in Figure 5. The sleeve member 15 is formed at its opposite ends with a retaining collar 17 which is slidably received in the next sleeve section 18, said sleeve section being formed with an annular flange 19 at its end restraining the sleeve member 15 from extension beyond the position shown in Figure 5. The sleeve member 18 is similarly slidably engaged in the hand grip member 20 and is restrained against extension therefrom by a suitable collar on its end portion cooperating with an inturned flange on the end of the hand grip member 20, in a manner similar to that described with respect to the other sections of the handle 11.

Integrally secured to the end of the rod member 13 is a ring 21 to which is secured a flexible mesh basket 22 of any suitable flexible mesh material. The mesh basket 22 is held in stretched condition by a flexible frame comprising a first U-shaped rod member 23 formed at its central portion with a loop 24 through which is inserted a second U-shaped rod member 25 extending transverse to the U-shaped member 23. The ends of the U-shaped member 23 are formed with upwardly facing hook elements 26 which extend through the meshes of the flexible basket 22 and the ends of U-shaped member 25 are formed with downwardly facing hook elements 26' which receive the ring member 21 in the manner shown in Figure 4, whereby the members 23 and 25 are held in tension and exert outward stretching force on the mesh bag 22.

Referring now to Figures 2 and 3, it will be seen that the prod member, designated generally at 27, comprises an extensible handle 28 similar to the handle described above in connection with the hand net. The end rod of the handle 28 is shown at 29. The end of rod 29 is provided with a laterally bent, flattened extension 30. The handle 28 is provided at its opposite end with a hand grip 31 similar to the hand grip 20 provided on the handle 12 of the hand net 11.

In using the device, both the hand net 11 and the prod member 27 are extended to their full length, as shown in Figure 7. The operator holds the hand net 11 by the hand grip 20 in one hand and holds the prod member 27 by its hand grip 31 in the other hand, as shown, and extends the basket 22 into the water, employing the prod member 27 to push bait into the basket 22 by means of the laterally projecting extension 30 on the end rod 29 of the prod member.

When the elements of the apparatus are not in use they may be collapsed to a relative small length and may be very easily transported or stored.

While a specific embodiment of an improved fish bait-catching apparatus has been disclosed in the foregoing description, it will be understood that various modifications within the spirit of the invention may occur to those skilled in the art. Therefore it is intended that no limitations be placed on the invention except as defined by the scope of the appended claim.

What is claimed is:

A fish bait-catching device comprising an elongated handle member, a ring rigidly carried at one end of said handle member, a flexible mesh basket member secured to said ring, and a resilient expansive frame in said basket member, said frame comprising a first U-shaped resilient rod element formed at its mid-portion with a loop, a second U-shaped resilient rod element engaged through said loop, downwardly facing hook elements on the ends of the second rod element engaged over said ring, and upwardly facing hook elements on the ends of the first rod element engaged beneath said ring.

JOHNNIE J. BROWN, Jr.

REFERENCES CITED

The following references are of record in the file of this patent:

UNITED STATES PATENTS

| Number | Name | Date |
|---|---|---|
| 308,015 | Tobin | Nov. 11, 1884 |
| 345,318 | Poor | July 13, 1886 |
| 361,489 | Cornish et al. | Apr. 19, 1887 |
| 708,797 | Coffin | Sept. 9, 1902 |
| 784,141 | Brest | Mar. 7, 1905 |
| 989,473 | Anderson | Apr. 11, 1911 |
| 1,149,878 | Washburn et al. | Aug. 10, 1915 |
| 2,190,987 | Jackson | Feb. 20, 1940 |